A. L. BAUSMAN.
ROTARY PUMP.
APPLICATION FILED JULY 24, 1917.
1,309,237.
Patented July 8, 1919.
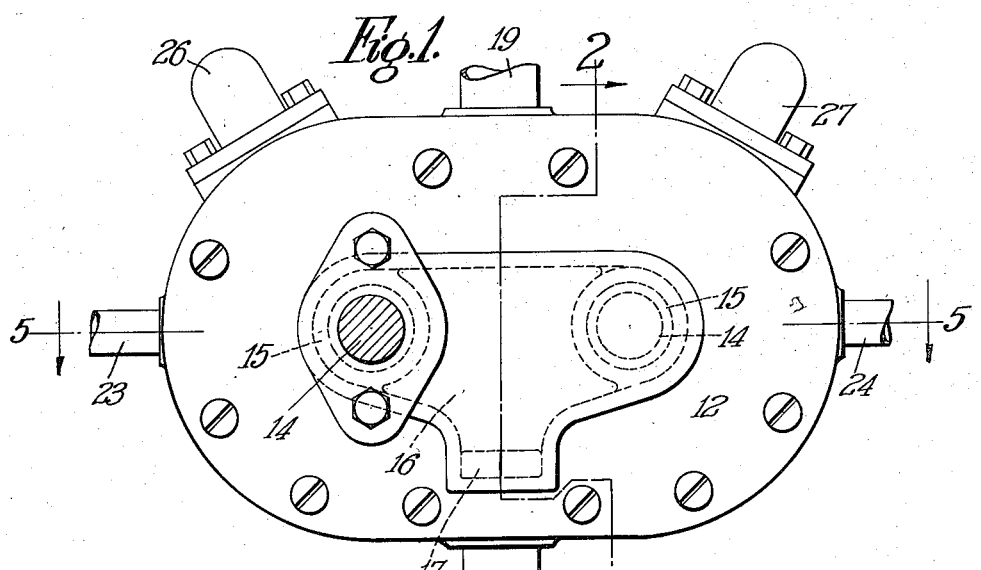
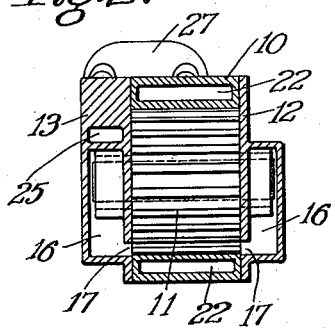
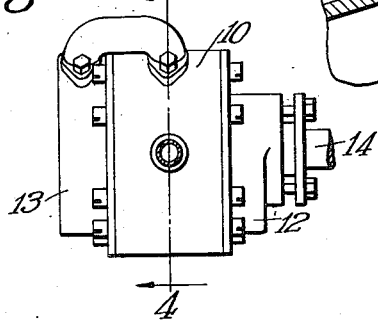
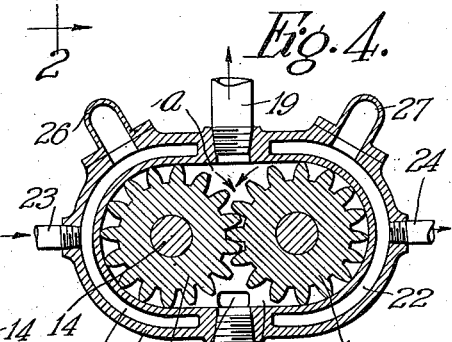
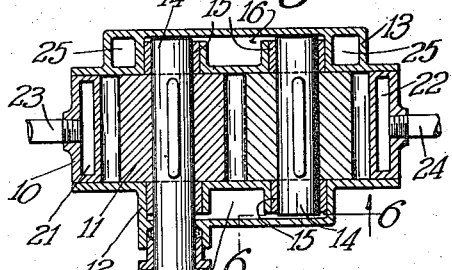
WITNESSES:
W. C. Ron.
INVENTOR.
Alonzo L. Bausman.
BY Chapin + Neal.
ATTORNEYS.

UNITED STATES PATENT OFFICE.

ALONZO LINTON BAUSMAN, OF CHICOPEE, MASSACHUSETTS, ASSIGNOR TO NATIONAL EQUIPMENT COMPANY, OF SPRINGFIELD, MASSACHUSETTS, A CORPORATION OF MASSACHUSETTS.

ROTARY PUMP.

1,309,237.  Specification of Letters Patent.  Patented July 8, 1919.

Application filed July 24, 1917. Serial No. 182,420.

*To all whom it may concern:*

Be it known that I, ALONZO LINTON BAUSMAN, a citizen of the United States of America, residing in the city of Chicopee, county of Hampden, and State of Massachusetts, have invented certain new and useful Improvements in Rotary Pumps, of which the following is a specification.

This invention relates to rotary pumps for feeding material, such as chocolate and the like, and more particularly to the lubrication of pumps of the type and for the purpose described. By material such as chocolate and the like is meant a material to be pumped which material itself has some lubricating value and particularly such material as would be injured by contact with commonly used lubricants.

With the more recent developments in the confectionery art, it has become desirable to employ rotary pumps, such as gear pumps, for example, in feeding the coating material, such as chocolate and the like, from a supply to the desired point. The attempted use of rotary pumps for the purpose of pumping chocolate has, however, led to difficulties and such pumps have not heretofore been generally successful. The trouble experienced, when such pumps have been used to pump material such as chocolate, and the reason why they have not been entirely successful heretofore, I believe is due to the difficulties arising from lubrication of the moving parts of the pump.

Special problems arise when pumps of the type mentioned are used for the purpose of pumping chocolate. Oil and other usual lubricating mediums are not satisfactory for the reason that when oil and the like is used for the lubrication of gear pumps, it is difficult to prevent the oil from mixing with the pumped chocolate. The chocolate itself is a suitable lubricant, and the first conception is to utilize the chocolate as oil is customarily utilized, namely, by using it over and over again. The use of chocolate for lubrication in the manner described, however, is not satisfactory in that the chocolate soon burns through repeated use which results in the loss of its lubricating qualities and consequent inadequate lubrication of the pump.

According to one feature of the invention, the chocolate is utilized for lubricating the moving parts of the pump, by providing one or more paths along which some of the pumped chocolate may circulate from the high to the low pressure side of the pump, and in its circulation lubricate all the moving surfaces of the latter. This feature of the invention is characterized in that none of the chocolate is wasted in lubricating the pump for, after having performed its lubricating function, it is again carried to the high pressure side of the pump and expelled. A further advantageous effect is obtained according to this feature of the invention in that fresh lubricant is continually supplied to the moving parts of the pump, as distinguished from using the material over and over again.

According to another feature of the invention, the pump of the character described is arranged to be heated, whereby the chocolate may be kept in fluid condition and at a temperature best calculated to accomplish its lubricating function.

Other features of the invention will appear in the illustrative embodiment of it in the drawings—

Figure 1 is an elevational view of a rotary pump embodying the invention;

Fig. 2 is a cross sectional view taken on the line 2—2 of Fig. 1;

Fig. 3 is an end elevational view of the pump;

Fig. 4 is a longitudinal sectional view thereof taken on the line 4—4 of Fig. 3;

Fig. 5 is a sectional plan view taken on the line 5—5 of Fig. 1; and

Fig. 6 is a detail sectional view taken on the line 6—6 of Fig. 5.

In the illustrated embodiment of the invention, the well known gear pump has been shown as typifying one rotary pump in which the invention may be embodied. The pump illustrated comprises a casing 10, which has an opening therethrough to receive a pair of intermeshing gears 11, and front and rear cover plates 12 and 13, respectively, suitably secured to the casing, as shown in Figs. 1 and 3, to close said opening. The gears 11 are keyed, as shown in Fig. 5 to shafts 14, the ends of which are mounted in bearing bushings 15 fixed in the cover plates 12 and 13 in any suitable manner.

The ends of shafts 14 do not extend entirely through the cover plates except for one end of one shaft 14 which extends outwardly through a suitable stuffing box (Fig. 5) in cover 12 for driving connections with a suitable source of power. The ends of shafts 14, with the exception noted, and the ends of all the bearing bushings 15 terminate within recesses 16 formed in the cover plates, so that the ends of the bearing bushings are spaced from the outer walls of the cover plates. The shape of each recess 16 is clearly shown in Fig. 1 and, as there shown, each recess surrounds the ends of the bushings 15, extends from one bushing to the other, and has a central portion which slopes downwardly toward the base of the pump. A port 17 connects the lower part of each recess 16 to the lower part of the gear chamber, as clearly shown in Figs. 2 and 4.

The interior end walls of casing 10 are semi-circular, and the outer ends of the teeth slide on these semi-circular walls, as the gears are turned in the direction of the arrow shown in Fig. 4. Chocolate enters the casing 10 centrally between the gears through an inlet pipe 18 threaded into the bottom of casing 10. The chocolate is carried between the gear teeth, and the described semi-circular end walls upwardly and since no appreciable amount of chocolate can return centrally downward between the intermeshing gears, it is expelled upwardly through an outlet pipe 19 in the now well known manner.

The central upper and lower spaces between the intermeshing gears, contain chocolate at different pressures, the pressure of the chocolate in space $a$ being higher than in space $b$. There is thus a force, equal to the difference in fluid pressure in spaces $a$ and $b$, which tends to move chocolate from the former to the latter. The sides of gears 11 closely fit between the covers 12 and 13, but there is a small amount of clearance therebetween, and some of the chocolate in space $a$ is forced by fluid pressure to fill the clearance spaces and thus lubricate the ends or sides of the gears. The chocolate, between the sides of the gears and the cover members, is forced to travel from space $a$ to space $b$ and in so traveling some of the chocolate reaches the shafts 14 and passes from each side of the gears between the shafts and their bushings 15 outwardly to the described recesses 16. The chocolate does not pass inwardly between the shafts and the gears since the former tightly fit the latter. Preferably the bore of bushings 15 is provided with a plurality of grooves 20 (Fig. 6) to facilitate the passage of the chocolate between the shaft and bushing. The chocolate returns from recess 16 through port 17 to the space $a$ and from the latter is subsequently carried by the gears to the space $b$. Thus it will be apparent that a portion only of the chocolate being pumped is shunted from space $a$ to space $b$ to lubricate the gears and shafts of the pump and furthermore in the construction shown the same portion is not likely to make this back eddy twice.

It will now be apparent that a pump of the type described is more satisfactorily lubricated with chocolate when the latter is maintained in fluid condition. To insure that the chocolate is kept in the fluid state, semi-circular jackets 21 and 22 are formed in the walls of casing 1, as clearly shown in Fig. 4. An inlet pipe 23 is connected to the jacket 21 to admit a suitable heating medium (or cooling medium in hot weather), such as steam, hot water, cold water, and the like. Jacket 22 is provided with an outlet pipe 24 for the escape of the temperature controlling medium. The cover 13 is provided with a circuitous cored passage 25, one end of which is connected by a manifold 26 to the passage 21 and the other end by a manifold 27 to the passage 22. Thus, the temperature controlling medium may pass from the passage 21 through manifold 26 to the passage 25 and thence through manifold 27 to the passage 22 and outlet 24. The other cover 12 may be similarly heated or cooled, if desired, but I have found that it is generally unnecessary so to do for enough radiation surface is provided from the described passages to effectually keep the chocolate in a fluid state and at a temperature at which its lubricating function is best accomplished.

A feature of particular importance is the lubrication of the bearings 15 and the sides of gears 11 by a circulation of a part of the pumped material. As distinguished from the lubrication of parts by using the lubricant over and over again, the described arrangement permits fresh lubricant to be continually fed to the moving parts. This is especially important, when as here the lubricant consists of chocolate or the like, for such substances soon lose their lubricating qualities if used repeatedly. The chocolate if so used, soon burns and, when this happens, its effectiveness as a lubricating medium is destroyed, and injury to the pump occurs through insufficient lubrication. The arrangement described is furthermore characterized in that none of the chocolate is wasted. Although some of the chocolate pumped to space $a$ flows in a by-pass path back to space $b$ to lubricate the parts, this by-passed portion of the chocolate is subsequently returned by the gears to the space $a$ and expelled.

A further feature of importance is the provision of means to heat the chocolate as it passes through the pump, whereby the chocolate may be kept in fluid condition. As distinguished from ordinary lubricants, chocolate is of the most lubricating value when in the fluid state. Therefore, for successful lubrication of the pump by chocolate, the heating means is desirable and particularly when starting the pump, for, otherwise, the grooves 20 and the clearance spaces between gears and cover plates would be filled with hardened chocolate which, not only would have small lubricating value, but would also prevent fluid chocolate drawn into the pump from passing in the desired circulatory lubricating paths. Furthermore, there is a certain range of temperature in which the chocolate is best adapted for lubrication, and, if the chocolate be maintained within this range by the heating or cooling means, its maximum lubricating value may be obtained.

I have now disclosed in detail the preferred form of my invention, but many other forms and arrangements will readily suggest themselves to those skilled in the art, having for their object the use of the invention in a specific form differing from the precise one disclosed. For example, the paths from the high to the low pressure side of the pump, and the type of rotating elements of the pump may be varied in numerous ways and still embody the invention. I, therefore, desire to have the scope of the invention determined by the following claim, interpreted in the spirit of the disclosure of one exact form rather than in the letter of the exact form disclosed.

What I claim is—

A rotary pump, for pumping material of lubricating character, comprising a casing having an inlet and an outlet and being otherwise closed, a wall of said casing comprising an inner and an outer partition, spaced each from the other, the inner being provided with a journal bearing extending toward, but clear of, the outer, and open from end to end; said pump also comprising a rotary pumping element constructed to force material from the inlet to the outlet and place the material under pressure at the outlet, such element being provided with a shaft lying in said bearing with sufficient clearance to permit the passage of said material therealong, there being a connection between said clearance and the outlet side of said pump and there being a connection between the space between said partitions and the inlet side of said pump; whereby the material will be forced from the outlet side along said shaft, along the entire length of said bearing, into said space, and to the inlet side of said pump; substantially as described.

ALONZO LINTON BAUSMAN.